(12) United States Patent
Hou et al.

(10) Patent No.: US 11,914,430 B2
(45) Date of Patent: Feb. 27, 2024

(54) SUPPORT APPARATUS FOR FLEXIBLE SCREEN, FOLDABLE DISPLAY MODULE, AND DISPLAY DEVICE

(71) Applicant: KunShan Go-Visionox Opto-Electronics Co., Ltd., Jiangsu (CN)

(72) Inventors: Hongqi Hou, Kunshan (CN); Qi Shan, Kunshan (CN); Jianping Chen, Kunshan (CN); Fu Liao, Kunshan (CN); Liwei Ding, Kunshan (CN); Zhaoji Zhu, Kunshan (CN); Liuyang Wang, Kunshan (CN); Kanglong Sun, Kunshan (CN)

(73) Assignee: KunShan Go-Visionox Opto-Electronics Co., Ltd., Kunshan (CN)

( * ) Notice: Subject to any disclaimer, the term of this patent is extended or adjusted under 35 U.S.C. 154(b) by 381 days.

(21) Appl. No.: 17/361,949

(22) Filed: Jun. 29, 2021

(65) Prior Publication Data

US 2021/0325941 A1 Oct. 21, 2021

Related U.S. Application Data

(63) Continuation of application No. PCT/CN2020/074909, filed on Feb. 12, 2020.

(30) Foreign Application Priority Data

Jun. 25, 2019 (CN) .......................... 201910556286.4

(51) Int. Cl.
*G06F 1/16* (2006.01)
*H04M 1/02* (2006.01)

(52) U.S. Cl.
CPC .......... *G06F 1/1681* (2013.01); *G06F 1/1616* (2013.01); *G06F 1/1641* (2013.01); *H04M 1/0268* (2013.01)

(58) Field of Classification Search
CPC ............................ G06F 1/1652; G06F 1/1681
See application file for complete search history.

(56) References Cited

U.S. PATENT DOCUMENTS

| 9,874,906 | B1 | 1/2018 | Hsu | |
|---|---|---|---|---|
| 11,079,804 | B2 * | 8/2021 | Zhu | ........................ G06F 1/1616 |
| 2012/0307423 | A1 * | 12/2012 | Bohn | ................... H04M 1/0216 |
| | | | | 361/679.01 |

(Continued)

| 2016/0132075 | A1 * | 5/2016 | Tazbaz | ................... G06F 1/1616 |
|---|---|---|---|---|
| | | | | 361/679.27 |

FOREIGN PATENT DOCUMENTS

| CN | 205510132 U | 8/2016 |
|---|---|---|
| CN | 207909434 U | 9/2018 |

(Continued)

OTHER PUBLICATIONS

ISA State Intellectual Property Office of the People's Republic of China, International Search Report Issued in Application No. PCT/CN2020/074909, dated Apr. 23, 2020, WIPO, 4 pages.

(Continued)

*Primary Examiner* — Adrian S Wilson
(74) *Attorney, Agent, or Firm* — Maier & Maier, PLLC

(57) ABSTRACT

A support apparatus for a flexible screen, a foldable display module and a display device. The support apparatus for the flexible screen includes a support portion and a driving assembly. The support portion includes a first support portion and a second support portion connected with the first support portion. The driving assembly includes a rotary shaft assembly and a linkage assembly connected with the rotary shaft assembly. The rotary shaft assembly includes a plurality of rotary shafts arranged in parallel. The second support portion is slidably provided on the rotary shaft (Continued)

assembly and can be bent or unfolded together with the rotary shaft assembly. When the rotary shaft assembly is bent, the first support portion is driven by the linkage assembly to move away from or close to the rotary shaft assembly.

20 Claims, 7 Drawing Sheets

(56) References Cited

U.S. PATENT DOCUMENTS

| | | | | |
|---|---|---|---|---|
| 2016/0195901 | A1* | 7/2016 | Kauhaniemi | G06F 1/1652 361/679.27 |
| 2016/0299532 | A1* | 10/2016 | Gheorghiu | H04B 1/3888 |
| 2016/0324023 | A1* | 11/2016 | Kim | G06F 1/1681 |
| 2018/0011515 | A1* | 1/2018 | Yoo | G06F 1/1652 |
| 2018/0110139 | A1* | 4/2018 | Seo | G06F 1/1681 |
| 2019/0112852 | A1 | 4/2019 | Hsu | |
| 2020/0264670 | A1* | 8/2020 | Zhu | G09F 9/301 |
| 2021/0325941 | A1* | 10/2021 | Hou | G06F 1/1652 |
| 2022/0276675 | A1* | 9/2022 | Hou | G06F 1/1618 |
| 2023/0188631 | A1* | 6/2023 | Hou | G09F 9/301 361/679.27 |
| 2023/0199092 | A1* | 6/2023 | Hou | G06F 1/1681 455/575.3 |

FOREIGN PATENT DOCUMENTS

| | | |
|---|---|---|
| CN | 108874048 A | 11/2018 |
| CN | 208734715 U | 4/2019 |
| CN | 208820828 U | 5/2019 |
| CN | 109887417 A | 6/2019 |
| CN | 110273915 A | 9/2019 |
| TW | 201921222 A | 6/2019 |
| WO | 2016190486 A1 | 12/2016 |

OTHER PUBLICATIONS

ISA State Intellectual Property Office of the People's Republic of China, Written Opinion of the International Searching Authority Issued in Application No. PCT/CN2020/074909, dated Apr. 23, 2020, WIPO, 6 pages.(Submitted with Machine/Partial Translation).

State Intellectual Property Office of the People's Republic of China, Office Action and Search Report Issued in Application No. 2019105562864, dated Feb. 6, 2020, 18 pages. (Submitted with Machine/Partial Translation).

State Intellectual Property Office of the People's Republic of China, Office Action and Search Report Issued in Application No. 2019105562864, dated May 15, 2020, 5 pages. (Submitted with Machine/Partial Translation).

* cited by examiner

US 11,914,430 B2

SUPPORT APPARATUS FOR FLEXIBLE SCREEN, FOLDABLE DISPLAY MODULE, AND DISPLAY DEVICE

CROSS-REFERENCE TO RELATED APPLICATIONS

The present application is a continuation of International Application No. PCT/CN2020/074909, filed on Feb. 12, 2020, which claims priority to Chinese Patent Application No. 201910556286.4, filed on Jun. 25, 2019, both of which are hereby incorporated by reference in their entireties.

TECHNICAL FIELD

This application relates to a field of display technology, and in particular to a support apparatus for a flexible screen, a foldable display module and a display device.

BACKGROUND

A flexible display device with a flexible screen, such as mobile phone, tablet computer, etc., has a small volume when it is folded, and the flexible display device is convenient to carry. The flexible display device has a larger effective display area when it is unfolded, which can improve a user experience. The above advantages make foldable display device more and more widely used.

During a folding process of the flexible display device, the flexible screen is stretched or squeezed to form wrinkles. Moreover, after several times of folding, the flexible screen cannot display normally.

SUMMARY

According to a first aspect of embodiments of the present application, there is provided a support apparatus for a flexible screen, including a support portion and a driving assembly. The support portion includes a first support portion and a second support portion connected with the first support portion. The driving assembly includes a rotary shaft assembly and a linkage assembly. The rotary shaft assembly includes at least three rotary shafts arranged in parallel. The second support portion is slidably provided on the rotary shaft assembly, and can be bent or unfolded together with the rotary shaft assembly. When the rotary shaft assembly is bent or unfolded, the first support portion is driven to move away from or close to the rotary shaft assembly through the linkage assembly.

According to a second aspect of the embodiments of the present application, there is provided a foldable display module including a flexible screen and the aforementioned support apparatus.

According to a third aspect of the embodiments of the present application, there is provided a display device including a shell and the aforementioned display module. When the rotary shaft assembly is bent, the shell is driven to move away from or close to the rotary shaft assembly through the linkage assembly.

With the support apparatus for the flexible screen, the foldable display module and the display device according to the embodiments of the present application, when the rotary shaft assembly is bent or unfolded, the first support portion may be driven to move away from or close to the rotary shaft assembly through the linkage assembly, such that the first support portion drives a part of the flexible screen provided on the first support portion to move away from or close to the rotary shaft assembly, so as to prevent the flexible screen from being stretched or squeezed due to difference between a bending radius of the flexible screen and a bending radius of the support apparatus during the folding process, which can increase a service life of the flexible screen. In addition, the rotary shaft assembly includes at least three rotary shafts arranged in parallel, and a cross-sectional shape of the rotary shaft assembly after being bent is closer to an arc shape, such that a cross-sectional shape of the second support portion located on the rotary shaft assembly is closer to an arc shape, and the second support portion has a better support effect on the flexible screen, which can avoid the unevenness of the flexible screen.

DETAILED DESCRIPTION OF THE EMBODIMENTS

Here, exemplary embodiments will be described in detail, and examples thereof are shown in the accompanying drawings. When the following description refers to the accompanying drawings, the same numbers in different drawings represent the same or similar elements, unless otherwise indicated. The implementations described in the following exemplary embodiments do not represent all implementations consistent with the present application. Rather, they are merely examples of apparatuses consistent with some aspects of the present application as detailed in the appended claims.

During a folding process of a flexible display device, a flexible screen is stretched or wrinkled, which causes an abnormal display of the flexible screen after several times of folding. In general, the flexible display device may include a flexible screen and a support apparatus for supporting the flexible screen, and the support apparatus can bend along with the flexible screen. The reason for the above problem is that, if the flexible screen is located outside of the support apparatus after the flexible display device is folded, a bending radius of a bending portion of the flexible screen is greater than a bending radius of a bending portion of the support apparatus during the folding process, such that the flexible screen is stretched; and if the flexible screen is located inside of the support apparatus after the flexible display device is folded, the bending radius of the bending portion of the flexible screen is smaller than the bending radius of the bending portion of the support apparatus during the folding process, such that the flexible screen is squeezed and wrinkles will be formed. The above two situations may damage the flexible screen and shorten a service life of the flexible display device.

In order to solve the above problem, the present application provides a support apparatus for a flexible screen, a foldable display module and a display device.

The support apparatus for the flexible screen, foldable display module and display device in the embodiments of the present application will be described in detail below with reference to the accompanying drawings. Features in the following embodiments and implementations may be supplemented or combined with each other without any conflict.

Figure 1:
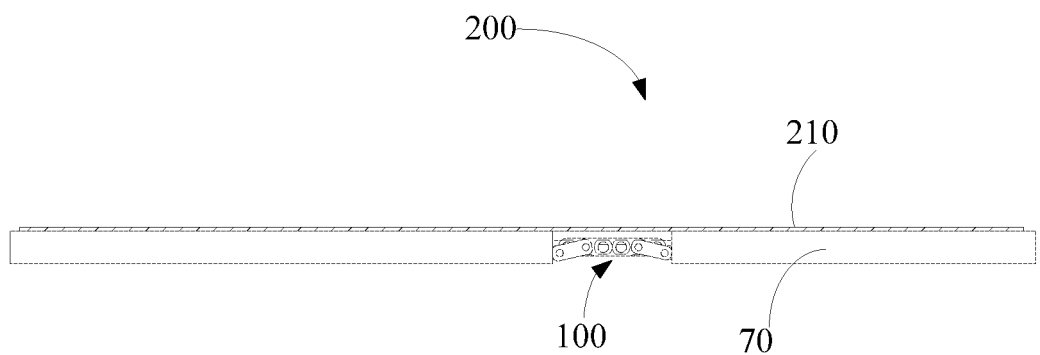
FIG. 1 is a schematic structural diagram of a display device when unfolded according to an embodiment of the present application.
Figure 2:
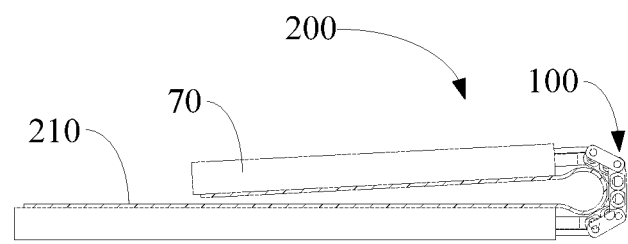
FIG. 2 is a schematic structural diagram of the display device when folded shown in FIG. 1.
Figure 3:
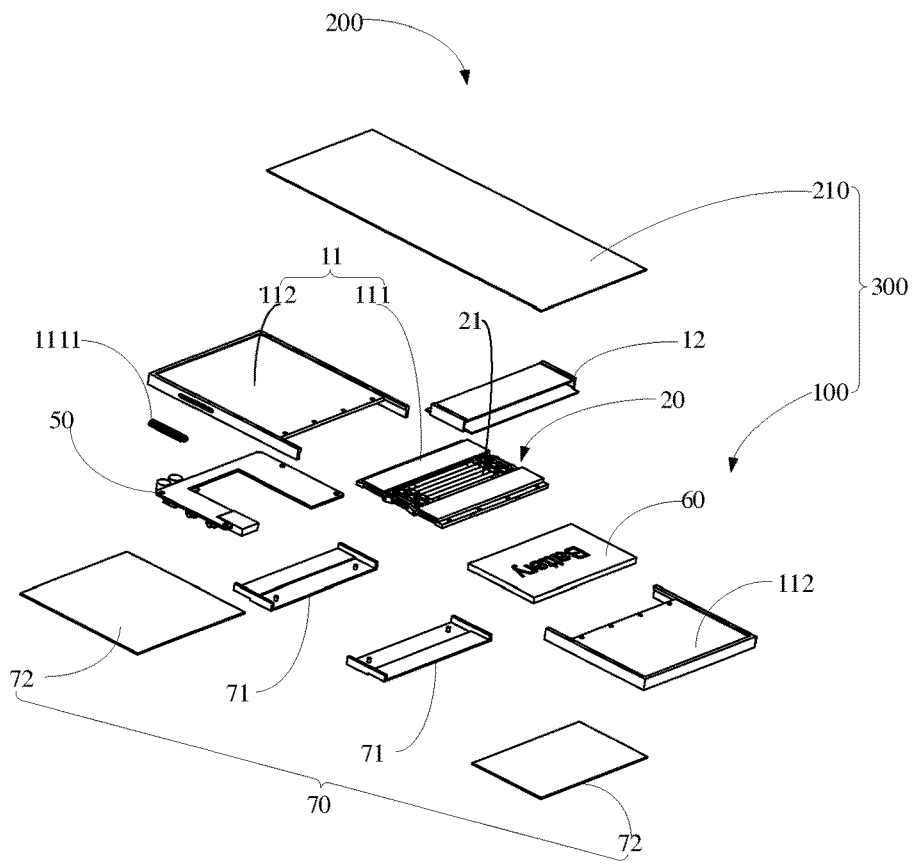
FIG. 3 is a schematic exploded view of the display device shown in FIG. 1.

The present application provides a display device. Referring to FIGS. 1-3, the display device 200 may include a foldable display module 300 and a shell 70. The foldable display module 300 may be partially received in the shell 70. The foldable display module 300 may include a flexible screen 210 and a support apparatus 100 for supporting the flexible screen 210.

Referring to FIG. 2, the display device 200 may be foldable. When the display device 200 is folded, the flexible screen 210 may be bent together with the support apparatus 100 for the flexible screen. As shown in FIG. 2, the display device 200 can be folded inwardly, that is, the flexible screen 210 is located inside of the support apparatus 100 after the display device 200 is folded. In addition, the display device 200 can be folded outwardly, that is, the flexible screen 210 is located outside of the support apparatus 100 after the display device 200 is folded.

Figure 4:
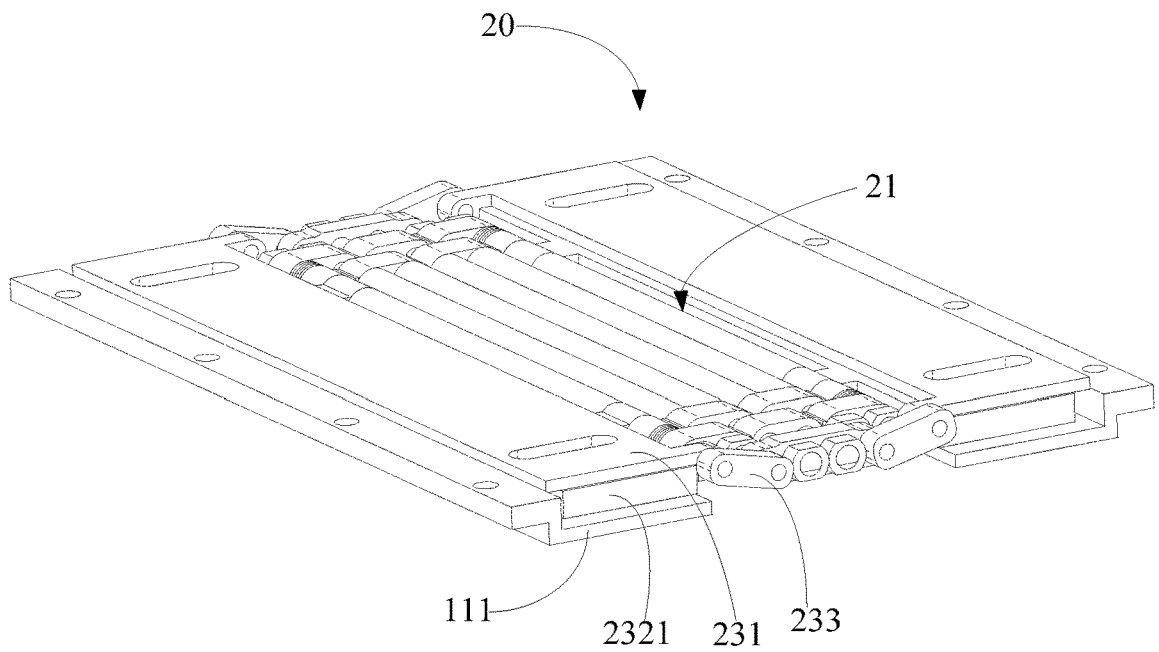
FIG. 4 is a schematic view of an assembled structure of a driving assembly and a first sub-support portion of a first support portion of the display device shown in FIG. 1.
Figure 5:
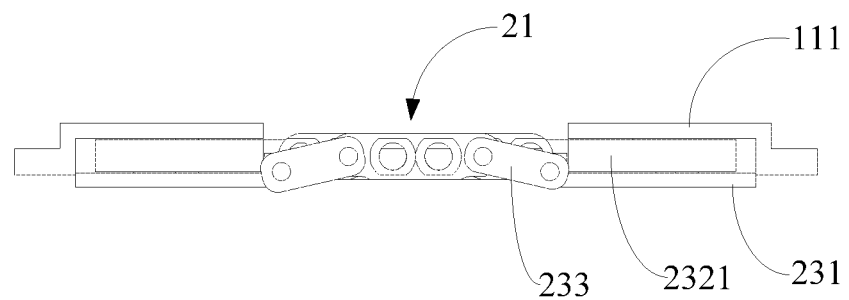
FIG. 5 is a side view of the structure shown in FIG. 4 when unfolded.

Referring to FIGS. 3-5, the support apparatus 100 for the flexible screen according to the present application includes a support portion and a driving assembly 20.

The support portion may include a first support portion 11 and a second support portion 12 connected with the first support portion 11. The driving assembly 20 may include a rotary shaft assembly 21 and a linkage assembly 23 connected with the rotary shaft assembly 21.

The rotary shaft assembly 21 may include, for example, at least three rotary shafts 211 arranged in parallel. The second support portion 12 may be slidably provided on the rotary shaft assembly 21, and the second support portion 12 can be bent or unfolded together with the rotary shaft assembly 21. When the rotary shaft assembly 21 is bent, the first support portion 11 may be driven to move away from or close to the rotary shaft assembly 21 through the linkage assembly 23. In contrast, when the rotary shaft assembly 21 is unfolded, the first support portion 11 may be driven to move close to or away from the rotary shaft assembly 21 through the linkage assembly 23.

With the support apparatus 100 for the flexible screen according to the present application, when the rotary shaft assembly 21 is bent, the first support portion 11 may be driven to move away from or close to the rotary shaft assembly 21 through the linkage assembly 23, such that the first support portion 11 may drive a part of the flexible screen provided on the first support portion 11 to move away from or close to the rotary shaft assembly 21, so as to prevent the flexible screen from being stretched or squeezed due to difference between the bending radius of the support apparatus and the bending radius of the flexible screen during the folding process, which can increase a service life of the flexible screen.

In addition, the rotary shaft assembly 21 may include at least three rotary shafts arranged in parallel, and a cross-sectional shape of the rotary shaft assembly 21 after being bent is closer to an arc shape, such that a cross-sectional shape of the second support portion 12 located on the rotary shaft assembly 21 after being bent is closer to an arc shape, and the second support portion 12 may have a better support effect on the flexible screen, which may avoid the unevenness of the flexible screen.

Figure 6:
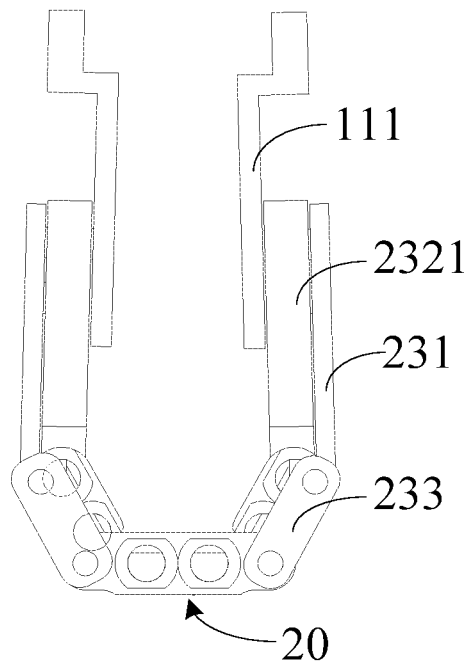
FIG. 6 is a side view of the structure shown in FIG. 4 when folded.

Specifically, referring to FIG. 6, when the support apparatus 100 is folded inwardly, that is, the first support portion 11 is located inside of the linkage assembly 23 after the support apparatus 100 is folded, the linkage assembly 23 may drive the first support portion 11 to slide away from the rotary shaft assembly 21, such that the first support portion 11 may drive the part of the flexible screen provided on the first support portion 11 to slide away from the rotary shaft assembly 21, thereby preventing the flexible screen from being squeezed. In contrast, when the support apparatus 100 is unfolded after being folded inwardly, the linkage assembly 23 may drive the first support portion 11 to slide close to the rotary shaft assembly 21, such that the first support portion 11 may drive the part of the flexible screen provided on the first support portion 11 to slide close to the rotary shaft assembly 21, thereby enabling the flexible screen to return to its original flat state (as shown in FIG. 1). When the support apparatus 100 is folded outwardly, that is, the first support portion 11 is located outside of the linkage assembly 23 after the support apparatus 100 is folded, the linkage assembly 23 may drive the first support portion 11 to slide close to the rotary shaft assembly 21, such that the first support portion 11 may drive the part of the flexible screen provided on the first support portion 11 to slide close to the rotary shaft assembly, thereby preventing the flexible screen from being stretched. In contrast, when the support apparatus 100 is unfolded after being folded outwardly, the linkage assembly 23 may drive the first support portion 11 to slide away from the rotary shaft assembly 21, such that the first support portion 11 may drive the part of the flexible screen provided on the first support portion 11 to slide away from the rotary shaft assembly 21, thereby enabling the flexible screen to return to its original flat state.

Optionally, the first support portion 11 may include a first sub-support portion 111 and a second sub-support portion 112 connected with each other, and the first sub-support portion 111 may be provided on the linkage assembly 23. The linkage assembly 23 may drive the first sub-support portion 111 to move close to or away from the rotary shaft assembly 21, and then the first sub-support portion 111 may drive the second sub-support portion 112 to move.

Figure 7:
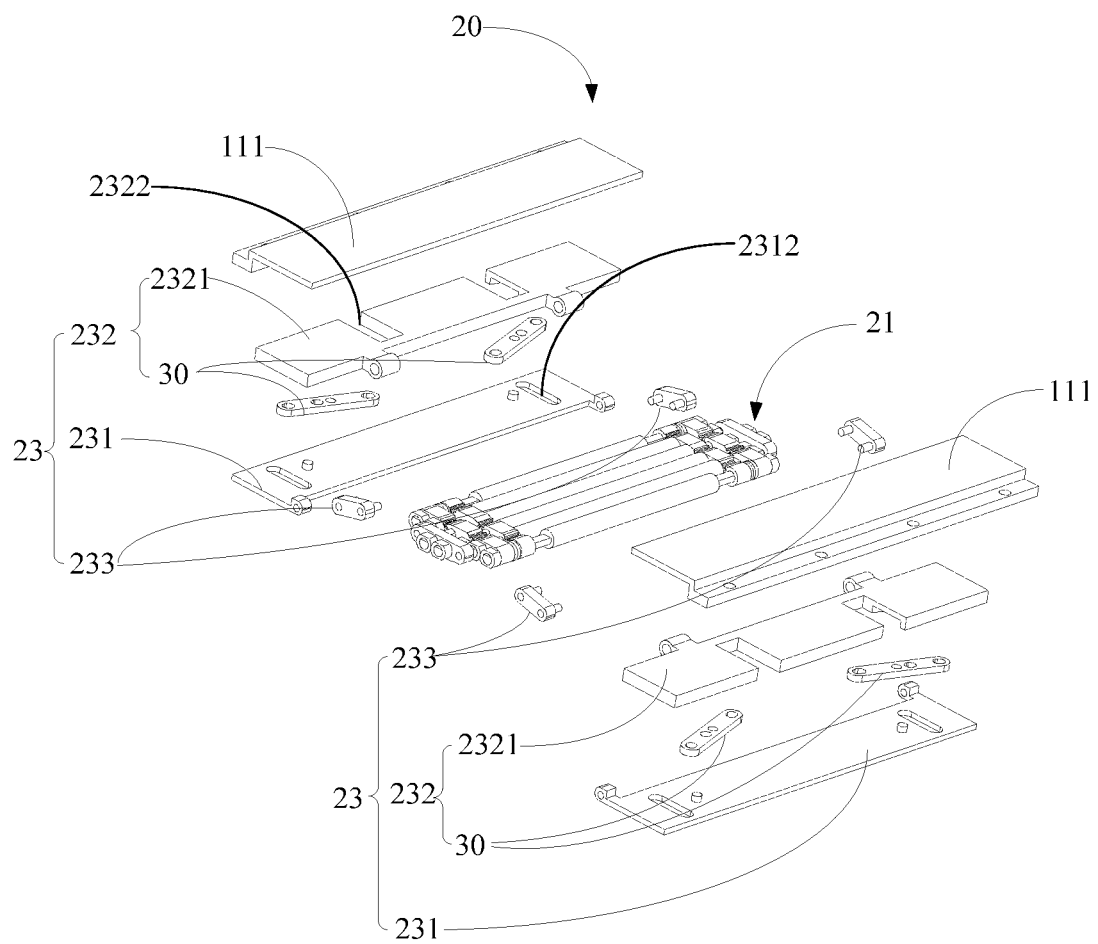
FIG. 7 is an exploded view of the structure shown in FIG. 4.
Figure 10:
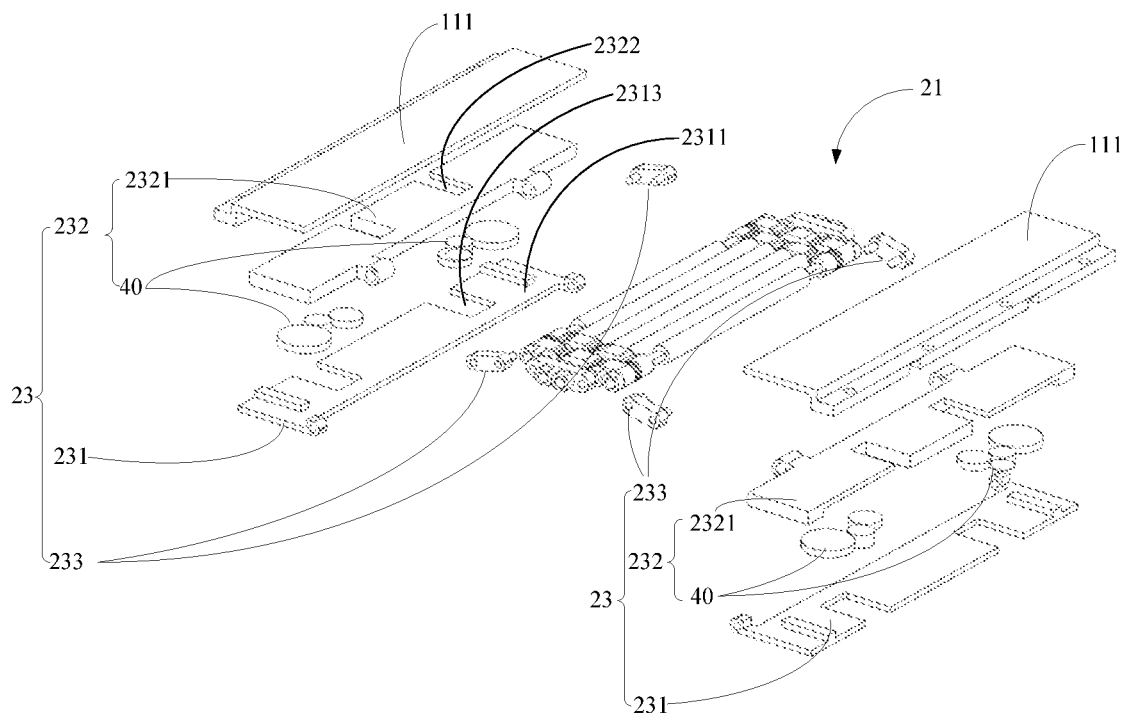
FIG. 10 is another exploded view of the structure shown in FIG. 4.

Referring to FIG. 7 or FIG. 10, the linkage assembly 23 may include a rotary shaft slider 231, a transmission assembly 232, and a plurality of connecting rods 233, and the rotary shaft slider 231 may be provided on the transmission assembly 232. The rotary shaft slider 231 may be rotatably connected with the rotary shaft assembly 21 through the connecting rods 233, and the rotary shaft slider 231 can slide relative to the transmission assembly 232. The transmission assembly 232 may be rotatably connected with the rotary shaft assembly 21. The rotary shaft slider 231 may be slidably connected with the transmission assembly 232. The first support portion 11 may be provided at a side of the transmission assembly 232 facing away from the rotary shaft slider 231.

The rotary shaft assembly 21, when bent or unfolded, may drive the transmission assembly 232 to rotate, and the transmission assembly 232 may drive the rotary shaft slider 231 to rotate. Since the rotary shaft slider 231 is connected with the rotary shaft assembly 21 through the connecting rods 233, and each of the connecting rods 233 has a constant length, and the rotary shaft slider 231 is provided at a side of the transmission assembly 232 facing away from the first support portion 11, when the rotary shaft slider 231 is rotating, the connecting rods 233 may drive the rotary shaft slider 231 to slide relative to the transmission assembly 232, such that a distance between the rotary shaft slider 231 and the rotary shaft assembly 21 remains unchanged. In addition, when the rotary shaft slider 231 is sliding relative to the transmission assembly 232, the rotary shaft slider 231 may drive the first support portion 11 to slide relative to the transmission assembly 232, such that the first support portion 11 may move away from or close to the rotary shaft assembly 21.

Specifically, if the rotary shaft slider 231 is located outside of the transmission assembly 232 after the support apparatus 100 is folded, when the support apparatus 100 is folded, the rotary shaft slider 231 may move close to the rotary shaft assembly 21 relative to the transmission assembly 232, and the first support portion 11 may move away from the rotary shaft assembly 21; and when the support apparatus 100 is unfolded, the rotary shaft slider 231 may move away from the rotary shaft assembly 21 relative to the transmission assembly 232, and the first support portion 11 may move close to the rotary shaft assembly 21. If the rotary shaft slider 231 is located inside of the transmission assembly 232 after the support apparatus 100 is folded, when the support apparatus 100 is folded, the rotary shaft slider 231 may move away from the rotary shaft assembly 21 relative to the transmission assembly 232, and the first support portion 11 may move close to the rotary shaft assembly 21; and when the support apparatus 100 is unfolded, the rotary shaft slider 231 may move close to the rotary shaft assembly 21 relative to the transmission assembly 232, and the first support portion 11 may move away from the rotary shaft assembly 21.

The driving assembly 20 may include two linkage assemblies, which are respectively located at both sides of the rotary shaft assembly 21 in an arrangement direction of a plurality of rotary shafts. Each of the linkage assemblies 23 may include the rotary shaft slider 231, the transmission assembly 232, and a plurality of connecting rods 233, and they are cooperated to drive the first support portion 11 to move relative to the rotary shaft assembly 21. The structure of the linkage assembly 23 is relatively simple and easy to implement.

Optionally, two opposite ends of each rotary shaft slider 231 in its longitudinal direction may be connected to the rotary shaft assembly 21 through respective connecting rods 233, such that the rotary shaft slider 231 may be connected with the rotary shaft assembly 21 more firmly, and the two opposite ends of the rotary shaft slider 231 may not be shifted when the rotary shaft slider 231 is rotating relative to the rotary shaft assembly 21.

Optionally, the transmission assembly 232 may include a rotary shaft connecting member 2321 and a transmission member provided on the rotary shaft connecting member 2321. The rotary shaft connecting member 2321 may be rotatably connected with the rotary shaft assembly 21, and the rotary shaft connecting member 2321 may be slidably connected with the rotary shaft slider 231 through the transmission member, and the rotary shaft connecting member 2321 may be slidably connected with the first support portion 11 through the transmission member.

The rotary shaft connecting member 2321, when rotating, may drive the rotary shaft slider 231 to rotate, and then the rotary shaft slider 231 may be driven to slide relative to the rotary shaft connecting member 2321 through the connecting rods 233. The sliding of the rotary shaft slider 231 relative to the rotary shaft connecting member 2321 may drive the transmission member to rotate relative to the rotary shaft connecting member 2321, and then the transmission member may drive the first support portion 11 to slide relative to the rotary shaft connecting member 2321.

Since the rotary shaft connecting member 2321 of the transmission assembly 232 is always connected with the rotary shaft assembly 21 and the rotary shaft connecting member 2321 may not slide relative to the rotary shaft assembly 21, this ensures a higher stability of an overall structure of the support apparatus for the flexible screen.

In some embodiments, the first support portion 11 may include a step-shaped first sub-support portion 111, and the first sub-support portion 111 has a step-shaped surface which is parallel to the arrangement direction of the at least three rotary shafts. The rotary shaft connecting member 2321 and the rotary shaft slider 231 may include respective surfaces which are parallel to the arrangement direction of the at least three rotary shafts, and the rotary shaft connecting member 2321 and the rotary shaft slider 231 are provided on the step-shaped surface of the first sub-support portion 111 which is close to the at least three rotary shafts in such a manner that the respective surfaces of the rotary shaft connecting member 2321 and the rotary shaft slider 231 face the step-shaped surface of the first sub-support portion 111.

Referring again to FIG. 3, the shell 70 of the display device 200 may include a first shell 71 and a second shell 72, and the second shell 72 is connected to the first shell 71 and the rotary shaft assembly 21 respectively. The first shell 71 and the second shell 72 may be provided at a side of the driving assembly 20 facing away from the first support portion 11. The second shell 72 and the first support portion 11 are arranged correspondingly, for example, the second shell 72 and the second sub-support portion are arranged correspondingly. The first shell 71 and the first support portion 11 are arranged correspondingly, for example, the first shell 71 and the first sub-support portion are arranged correspondingly.

Moreover, when the rotary shaft assembly 21 is bent, the first shell 71 may be driven to move away from or close to the rotary shaft assembly 21 through the linkage assembly 23, and a moving direction of the first shell 71 is opposite to a moving direction of the first sub-support portion 111, thereby preventing the first shell 71 from being squeezed or stretched.

Furthermore, the first shell 71 may be slidably connected with the first sub-support portion 111, and the first sub-support portion 111 may drive the first shell 71 to slide through the transmission member.

The structure of the transmission member can be designed in a plurality of forms, which will be described in detail below.

Figure 8:
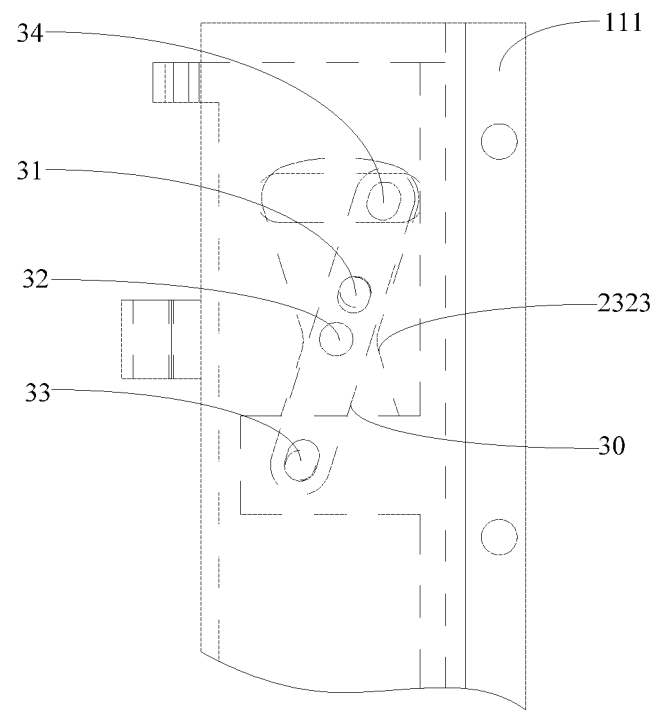
FIG. 8 is a partial top view of an assembled structure of the first sub-support portion, a transmission assembly and a rotary shaft slider shown in FIG. 7.
Figure 9:
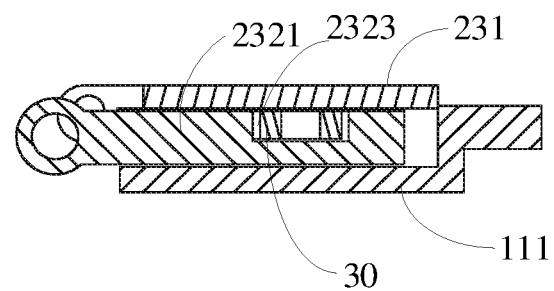
FIG. 9 is a partial cross-sectional view of the structure shown in FIG. 8.

Referring to FIGS. 7-9, the transmission member may include a swinging rod 30. The swinging rod 30 may be provided with a first connecting hole 31, a second connecting hole 32, and a third connecting hole 33 arranged at intervals sequentially in its extending direction. The swinging rod 30 may include a first end and a second end opposite to each other in its extending direction. The first end of the swinging rod 30 may be rotatably connected to the rotary shaft slider 231 through the first connecting hole 31, and the second end of the swinging rod 30 may be rotatably connected to the first support portion 11 through the third connecting hole 33. The swinging rod 30 may be rotatably connected to the rotary shaft connecting member 2321 through the second connecting hole 32, and the swinging rod 30 may be configured to swing relative to the rotary shaft connecting member 2321 when the rotary shaft assembly 21 is bent or flattened. For example, the rotary shaft slider 231 and the first support portion 11 may be configured to slide relative to the rotary shaft connecting member 2321 in opposite directions through the swinging rod 30.

A connecting post may be provided on the rotary shaft slider 231, and the connecting post of the rotary shaft slider 231 may be cooperated with the first connecting hole 31 to enable a rotatable connection between the rotary shaft slider 231 and the swinging rod 30. A connecting post may be provided on the rotary shaft connecting member 2321, and the connecting post of the rotary shaft connecting member 2321 may be cooperated with the second connecting hole 32 to enable a rotatable connection between the rotary shaft connecting member 2321 and the swinging rod 30. A connecting post may be provided on the first support portion 11, and the connecting post of the first support portion 11 may be cooperated with the third connecting hole 33 to enable a rotatable connection between the first support portion 11 and the swinging rod 30.

A groove 2323 may be provided in the rotary shaft connecting member 2321, the groove 2323 is used for receiving the swinging rod 30, and the swinging rod 30 may rotate or swing in the groove 2323. By providing the groove in the rotary shaft connecting member 2321 to receive the swinging rod 30, this can prevent a thickness of the support apparatus 100 from increasing due to the setting of the swinging rod 30.

When the rotary shaft slider 231 slides relative to the rotary shaft connecting member 2321, the connecting post of the rotary shaft slider 231 may be cooperated with the first connecting hole 31 to drive the swinging rod 30 to swing relative to the rotary shaft connecting member 2321, and a sliding direction of the second end of the swinging rod 30 is opposite to a sliding direction of the rotary shaft slider 231, such that the second end of the swinging rod 30 may drive the first support portion 11 to slide relative to the rotary shaft connecting member 2321.

Since the second connecting hole 32 is located at a center position of the swinging rod 30 in the extending direction of the swinging rod, the swinging rod 30 may rotate or swing relative to the rotary shaft connecting member 2321 around the second connecting hole 32. Since the first connecting hole 31 and the third connecting hole 33 are located at both sides of the second connecting hole 32, a sliding direction of the first support portion 11 sliding relative to the rotary shaft connecting member 2321 is opposite to a sliding direction of the rotary shaft slider 231 sliding relative to the rotary shaft connecting member 2321.

In the embodiments of the present application, the transmission member adopts the form of the swinging rod. By only providing two swinging rods respectively at two sides of the rotary shaft connecting member 2321 in the longitudinal direction of the rotary shaft connecting member 2321, the rotary shaft slider 231 and the first support portion 11 may be driven to slide relative to the rotary shaft connecting member 2321, and a sliding direction of the rotary shaft slider 231 is opposite to a sliding direction of the first support portion 11, which may reduce a structural complexity of the support apparatus 100.

Furthermore, a distance between the first connecting hole 31 and the second connecting hole 32 may be less than a distance between the second connecting hole 32 and the third connecting hole 33. In this way, when the swinging rod 30 is swinging, a sliding distance of the first support portion 11 sliding relative to the rotary shaft connecting member 2321 may be greater than a sliding distance of the rotary shaft slider 231 sliding relative to the rotary shaft connecting member 2321, such that while the rotary shaft assembly 21 is bent or unfolded, a moving distance of the first support portion 11 may be greater, which is more beneficial to prevent the flexible screen from being squeezed or stretched.

In the embodiments of the present application, the distance between the third connecting hole 33 and the second connecting hole 32, and the distance between the first connecting hole 31 and the second connecting hole 32 may also be adjusted according to a distance that the first support portion 11 needs to move.

The transmission member may include two swinging rods, which are respectively provided at two opposite ends of the rotary shaft connecting member 2321 in the longitudinal direction of the rotary shaft connecting member 2321. When the rotary shaft connecting member 2321 is rotating, the two opposite ends of the rotary shaft connecting member 2321 may drive the rotary shaft slider 231 and the first support portion 11 to slide through respective swinging rods 30, so as to ensure the smooth sliding of the rotary shaft slider 231 and the first support portion 11.

Referring again to FIGS. 7-9, the swinging rods 30 may further be provided with a fourth connecting hole 34 at the first end thereof. A distance between the fourth connecting hole 34 and the second connecting hole 32 may be greater than the distance between the first connecting hole 31 and the second connecting hole 32. The first shell 71 may be connected with the swinging rod 30 through the fourth connecting hole 34, such that when the swinging rod 30 is swinging, the first shell 71 may be driven to slide relative to the rotary shaft connecting member 2321. A connecting post may be provided on the first shell 71, a through-hole 2312 may be provided in the rotary shaft slider 231, and the connecting post of the first shell 71 may pass through the through-hole 2312 to match with the fourth connecting hole 34.

Since the first connecting hole 31 and the fourth connecting hole 34 are located at the same side of the second connecting hole 32, a sliding direction of the rotary shaft slider 231 sliding relative to the rotary shaft connecting member 2321 is the same as a sliding direction of the first shell 71 sliding relative to the rotary shaft connecting member 2321. That is, when the support apparatus 100 is folded inwardly, the first shell 71 may move close to the rotary shaft assembly 21; and when the support apparatus 100 is folded outwardly, the first shell 71 may move away from the rotary shaft assembly 21. This may prevent the first shell 71 from being stretched or squeezed when the support apparatus 100 is folded.

Figure 11:
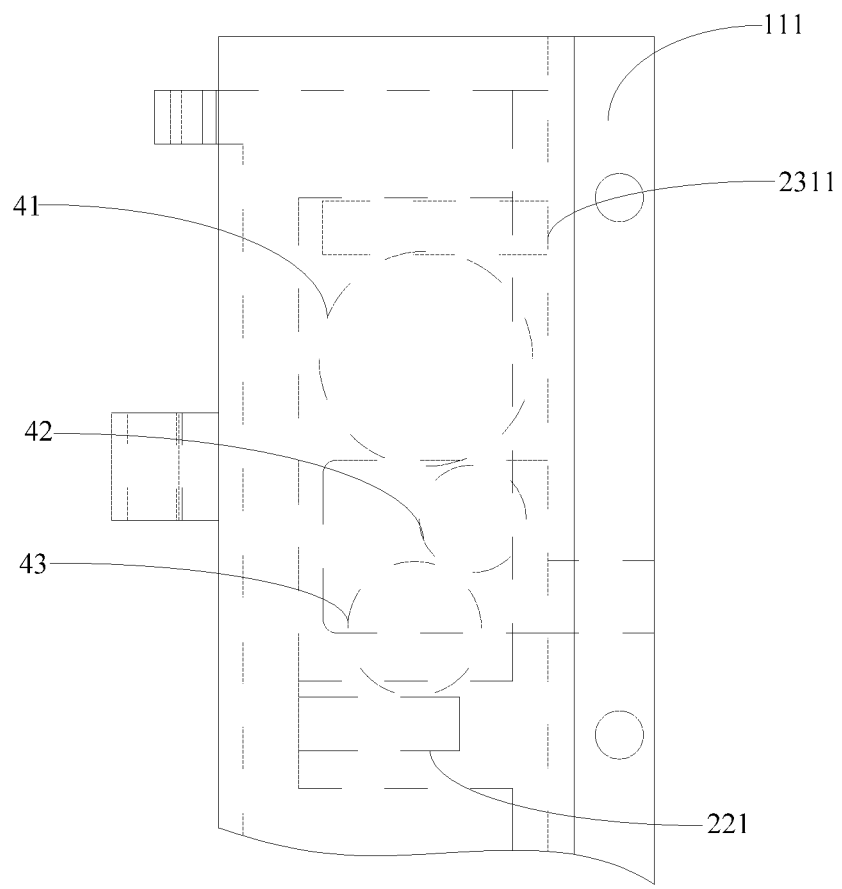
FIG. 11 is a partial top view of an assembled structure of the first sub-support portion, a transmission assembly and a rotary shaft slider shown in FIG. 10.
Figure 12:
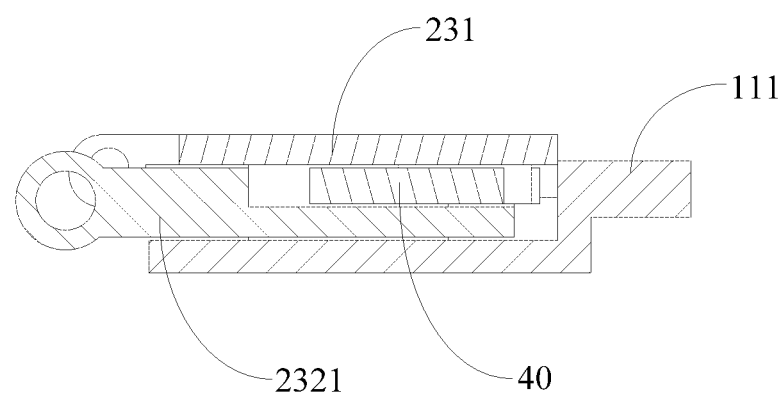
FIG. 12 is a partial cross-sectional view of the structure shown in FIG. 11.

Referring to FIGS. 10-12, the transmission member may include a gear assembly 40, a first rack 2311 may be provided on the rotary shaft slider 231, a second rack 221 may be provided on the first support portion 11, and the gear assembly 40 may mesh with the first rack 2311 and the second rack 221 respectively.

When the rotary shaft slider 231 is sliding relative to the rotary shaft connecting member 2321, since the first rack 2311 of the rotary shaft slider 231 meshes with the gear assembly 40, the rotary shaft slider 231 may drive the gear assembly 40 to rotate through the first rack 2311, and the rotation of the gear assembly 40 may drive the first support portion 11 to slide relative to the rotary shaft connecting member 2321 through the second rack 221.

The sliding of the rotary shaft slider 231 drives the sliding of the first support portion 11 by the gear assembly, which may make a structure of the support apparatus 100 simple and easy to implement.

Furthermore, the gear assembly 40 may include a first gear 41, a second gear 42, and a third gear 43. The first gear 41 may mesh with the second gear 42 and the first rack 2311 respectively, and the third gear 43 may mesh with the second rack 221 and the second gear 42 respectively. The first rack 2311, when sliding with the rotary shaft slider 231, may drive the first gear 41 to rotate, the first gear 41 may drive the second gear 42 to rotate, the second gear 42 may drive the third gear 43 to rotate, and the third gear 43 may drive the second rack 221 to slide. In this way, the first support portion 11 may slide relative to the rotary shaft connecting member 2321.

An open slot 2322 may be provided in the rotary shaft connecting member 2321, and the third gear 43 may pass through the open slot 2322 to mesh with the second rack 221 of the first support portion 11.

By providing the first gear 41, the second gear 42 and the third gear 43 of the gear assembly 40, a sliding direction of the rotary shaft slider 231 sliding relative to the rotary shaft connecting member 2321 is opposite to a sliding direction of the first support portion 11 sliding relative to the rotary shaft connecting member 2321.

Further, a transmission ratio of the gear assembly 40 may be greater than 1. That is, a rotational angular velocity of the third gear 43 is greater than a rotational angular velocity of the first gear 41, such that a moving speed of the second rack 221 may be greater than a moving speed of the first rack 2311. That is, a moving speed of the first support portion 11 moving relative to the rotary shaft connecting member 2321 is greater than a moving speed of the rotary shaft slider 231 moving relative to the rotary shaft connecting member 2321, such that a sliding distance of the first support portion 11 sliding relative to the rotary shaft connecting member 2321 may be greater than a sliding distance of the rotary shaft slider 231 sliding relative to the rotary shaft connecting member 2321 in the same time period, which is more beneficial to prevent the flexible screen from being squeezed or stretched.

The transmission member may include two gear assemblies 40, which may be respectively provided at two opposite ends of the rotary shaft connecting member 2321 in the longitudinal direction of the rotary shaft connecting member 2321. When the rotary shaft connecting member 2321 is rotating, the rotary shaft connecting member 2321 may drive the rotary shaft slider 231 and the first support portion 11 to slide through the gear assemblies 40 disposed at the two opposite ends of the rotary shaft connecting member 2321 respectively, so as to ensure the smooth sliding of the rotary shaft slider 231 and the first support portion 11.

Optionally, a third rack (not shown) may be provided on the first shell 71, an open slot 2313 may be provided in the rotary shaft slider 231, and the second gear 42 may pass through the open slot 2313 of the rotary shaft slider 231 to mesh with the third rack of the first shell 71. When the second gear 42 is rotating, the first shell 71 may be driven to slide relative to the rotary shaft connecting member 2321 through the third rack.

Since a direction of rotation of the second gear 42 is opposite to a direction of rotation of the first gear 41, a moving direction of the first rack 2311 moving relative to the rotary shaft connecting member 2321 is the same as a moving direction of the third rack moving relative to the rotary shaft connecting member 2321, such that a sliding direction of the first shell 71 sliding relative to the rotary shaft connecting member 2321 may be the same as a sliding direction of the rotary shaft slider 231 sliding relative to the rotary shaft connecting member 2321, which may prevent the first shell 71 from being squeezed or stretched when the display device is folded and unfolded.

In the embodiments of the present application, the transmission ratio of the gear assembly 40 may be adjusted according to a distance that the first support portion 11 needs to move.

Referring again to FIG. 3, the support portion may include two first support portions 11, which are respectively located at both sides of the rotary shaft assembly 21 in the arrangement direction of the rotary shafts, and the two first support portions 11 are respectively connected with the second support portion 12. The shell 70 may include two first shells 71 and two second shells 72, the two first shells 71 are respectively located at both sides of the rotary shaft assembly 21 in the arrangement direction of the rotary shafts, and the two second shells 72 are respectively located at both sides of the rotary shaft assembly 21 in the arrangement direction of the rotary shafts. The rotary shaft assembly 21, when bent, may drive the two first support portions 11 and the two first shells 71 to move close to or away from the rotary shaft assembly 21 at the same time.

Optionally, the support apparatus may further include a circuit board 50 and a battery 60. The circuit board 50 and the battery 60 may be respectively located at both sides of the rotary shaft assembly 21 in the arrangement direction of the rotary shafts. A receiving cavity may be formed between the first shell 71 and the first support portion 11 at one side of the rotary shaft assembly 21, and the circuit board 50 can be received in the receiving cavity. A receiving cavity may be formed between the first shell 71 and the first support portion 11 at the other side of the rotary shaft assembly 21, and the battery 60 can be received in the receiving cavity.

Optionally, the support apparatus may further include a button 1111, which may be disposed on a side of the first support portion 11, for example, the button 1111 is disposed on a side of the first support portion 11 in a direction perpendicular to the arrangement direction of the rotary shafts, and the button 1111 is configured to control an operation of the display device where the support apparatus is located.

Figure 13:
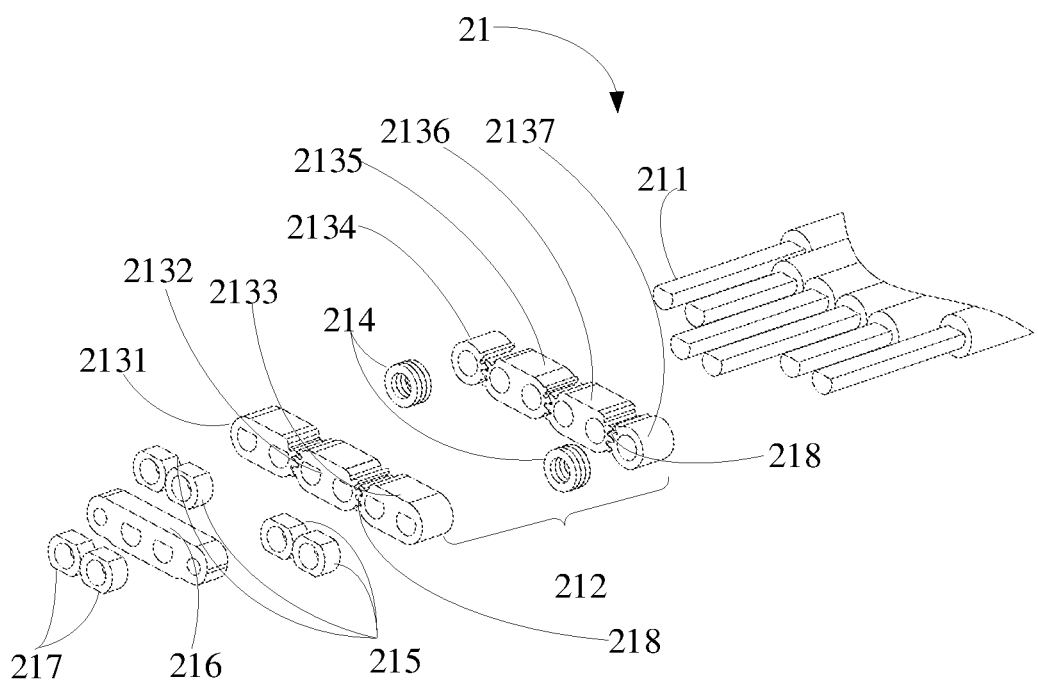
FIG. 13 is a partial exploded view of a rotary shaft assembly of the structure shown in FIG. 4.

Referring to FIG. 13, the rotary shaft assembly 21 may further include a linkage hinge 212, the linkage hinge 212 may include a plurality of linkage portions, and a plurality of adjacent rotary shafts may be connected through the plurality of linkage portions.

Since the at least three rotary shafts are connected through the plurality of linkage portions, bending of the rotary shaft assembly 21 may be implemented by relative rotation between adjacent linkage portions, thereby implementing the folding of the support apparatus 100; and unfolding of the rotary shaft assembly 21 may be implemented by relative rotation between adjacent linkage portions, thereby implementing the unfolding of the support apparatus 100.

Further, the linkage portions may be arranged in two rows, adjacent linkage portions in the same row may be meshed through transmission teeth, and adjacent linkage portions in different rows may be connected through respective rotary shafts, for example, connected in series. In this way, when adjacent two linkage portions of the same row of the linkage portions are rotating relative to each other, the linkage portions in the other row may be driven to rotate through the rotary shafts, which may make the rotation of the rotary shafts more stable.

Referring again to FIG. 13, the rotary shaft assembly 21 may include six rotary shafts 211. In the two rows of linkage portions of the linkage hinge 212, a total of six shaft holes may be provided in each row of the linkage portions, and the six rotary shafts 211 may be respectively connected with each row of the linkage portions through the six shaft holes of each row of the linkage portions. Three linkage portions are arranged in a first row, and each linkage portion may be provided with two shaft holes, and the shaft holes of the first row of the linkage portions may be non-rotatably connected with the rotary shafts. Four linkage portions are arranged in a second row, one shaft hole may be provided in each of two linkage portions which are disposed at two ends of the second row respectively, two shaft holes may be provided in each of the other two linkage portions of the second row of linkage portions, and the shaft holes of the second row of the linkage portions may be rotatably connected with the rotary shafts.

The three linkage portions in the first row may include a first linkage portion 2131, a second linkage portion 2132, and a third linkage portion 2133 sequentially arranged in a direction from one side to the other (for example, from left to right in an orientation shown in FIG. 13). The four linkage portions in the second row may include a fourth linkage portion 2134, a fifth linkage portion 2135, a sixth linkage portion 2136, and a seventh linkage portion 2137 sequentially arranged in the same direction as the linkage portions in the first row. The second linkage portion 2132 may be respectively meshed with the first linkage portion 2131 and the third linkage portion 2133 through the transmission teeth 218, the fifth linkage portion 2135 may be respectively meshed with the fourth linkage portion 2134 and the sixth linkage portion 2136 through the transmission teeth 218, and the sixth linkage portion 2136 may be meshed with the seventh linkage portion 2137 through the transmission teeth 218. The first linkage portion 2131 may be respectively connected with the fourth linkage portion 2134 and the fifth linkage portion 2135 through the rotary shafts, the second linkage portion 2132 may be respectively connected with the fifth linkage portion 2135 and the sixth linkage portion 2136 through the rotary shafts, and the third linkage portion 2133 may be respectively connected with the sixth linkage portion 2136 and the seventh linkage portion 2137 through the rotary shafts.

Assuming that the first linkage portion 2131 in the first row is stationary and serves as a reference, when the fourth linkage portion 2134 is rotating, the fourth linkage portion 2134 may drive the fifth linkage portion 2135 to rotate, the rotation of the fifth linkage portion 2135 may drive the second linkage portion 2132 and the sixth linkage portion 2136 to rotate, the rotation of the second linkage portion 2132 may drive the third linkage portion 2133 to rotate, and the rotation of the sixth linkage portion 2136 may drive the seventh linkage portion 2137 to rotate. Thus it can be seen that, the rotation of any of the linkage portions of the linkage hinge may drive all other linkage portions to rotate, and all linkage portions may rotate synchronously when the linkage hinge 212 is bent.

In the embodiments of the present application, the plurality of linkage portions may also be arranged in more than three rows. In two adjacent rows of linkage portions, one row of linkage portions and the other row of linkage portions may be arranged in a staggered pattern, for example, the number of the shaft holes of one linkage portion in one row may be equal to the number of the shaft holes of two linkage portions in the other row, such that the linkage portions in the two adjacent rows may rotate synchronously.

Referring again to FIG. 13, the rotary shaft assembly 21 may further include fasteners 214, 215 and 217, and a rod connecting member 216. The fastener 214 may be disposed between two adjacent rows of linkage portions and sleeved on the rotary shaft to prevent the linkage portions from moving on the rotary shaft. The fastener 215 may be disposed at the outermost side of the two rows of linkage portions, for example, disposed at the side of the first row of linkage portions away from the second row of linkage portions, and the fastener 215 may be sleeved on the rotary shaft 211. The rod connecting member 216 may be disposed at an outer side of the fastener 215, for example, disposed at the side of the fastener 215 away from the first row of linkage portions. The rod connecting member 216 may be sleeved on the rotary shaft and connected with the connecting rod 233, to realize a connection between the connecting rod 233 and the rotary shaft assembly 21. The fastener 217 may be disposed at an outer side of the rod connecting member 216, for example, disposed at the side of the rod connecting member 216 away from the fastener 215, and the fastener 217 may be sleeved on the rotary shaft to prevent the rod connecting member 216 from being separated from the rotary shaft.

The above are merely some embodiments of the present application, and not intended to limit the present application in any form. Although the present application has been disclosed as above in some embodiments, the present application is not limited thereto. Any person skilled in the art may utilize the technical contents disclosed above to make some changes or modifications into equivalent embodiments with equivalent changes without departing from the scope of the technical solution of the present application. However, any simple amendments, equivalent variations and modifications made to the above embodiments based on the technical essence of the present application without departing from the contents of the technical solution of the present application still fall within the scope of the technical solution of the present application.

The invention claimed is:

1. A support apparatus for a flexible screen, comprising:
a support portion comprising a first support portion and a second support portion connected with the first support portion;
a driving assembly comprising a rotary shaft assembly and a linkage assembly connected with the rotary shaft assembly;
a gear assembly;
a first rack; and
a second rack, wherein the gear assembly is configured to mesh with both the first rack and the second rack, the rotary shaft assembly comprises a plurality of rotary shafts arranged in parallel, the second support portion is slidably provided on the rotary shaft assembly, the second support portion is configured to be bent or unfolded together with the rotary shaft assembly, and the rotary shaft assembly is configured to:

when the rotary shaft assembly is bent, the first support portion is driven by the linkage assembly to move away from or close to the rotary shaft assembly.

2. The support apparatus according to claim 1, wherein the linkage assembly comprises:
a plurality of connecting rods;
a transmission assembly rotatably connected with the rotary shaft assembly; and
a rotary shaft slider provided on the transmission assembly and slidably connected with the transmission assembly, wherein the rotary shaft slider is rotatably connected with the rotary shaft assembly through the plurality of connecting rods, the first support portion is slidably connected with the transmission assembly, and the first support portion is provided at a side of the transmission assembly facing away from the rotary shaft slider.

3. The support apparatus according to claim 2, wherein the transmission assembly comprises: a rotary shaft connecting member rotatably connected with the rotary shaft assembly; and a transmission member provided on the rotary shaft connecting member, wherein the rotary shaft connecting member is slidably connected with the rotary shaft slider through the transmission member, and the rotary shaft connecting member is slidably connected with the first support portion through the transmission member.

4. The support apparatus according to claim 3, wherein the transmission member comprises a swinging rod provided with a first connecting hole, a second connecting hole, and a third connecting hole arranged at intervals in an extending direction of the swinging rod; the swinging rod comprises a first end and a second end opposite to each other in the extending direction of the swinging rod, the first end of the swinging rod is rotatably connected with the rotary shaft slider through the first connecting hole, and the second end of the swinging rod is rotatably connected with the first support portion through the third connecting hole; and the swinging rod is rotatably connected with the rotary shaft connecting member through the second connecting hole, and the swinging rod is configured to swing relative to the rotary shaft connecting member when the rotary shaft assembly is bent or flattened.

5. The support apparatus according to claim 4, wherein a distance between the first connecting hole and the second connecting hole is less than a distance between the second connecting hole and the third connecting hole.

6. The support apparatus according to claim 3, wherein the transmission member comprises the gear assembly, the rotary shaft slider is provided with the first rack, and the first support portion is provided with the second rack.

7. The support apparatus according to claim 6, wherein a transmission ratio of the gear assembly is greater than 1.

8. The support apparatus according to claim 6, wherein the gear assembly comprises:
a first gear that meshes with the first rack;
a second gear that meshes with the first gear; and
a third gear that meshes with the second rack and the second gear, respectively.

9. The support apparatus according to claim 3, wherein the plurality of rotary shafts comprises at least three rotary shafts, and the transmission assembly is provided at both sides of the at least three rotary shafts in an arrangement direction of the at least three rotary shafts; the first support portion comprises a step-shaped first sub-support portion, and the first sub-support portion has a step-shaped surface which is parallel to the arrangement direction of the at least three rotary shafts; and the rotary shaft connecting member and the rotary shaft slider comprise respective surfaces which are parallel to the arrangement direction of the at least three rotary shafts, and the rotary shaft connecting member and the rotary shaft slider are provided on the step-shaped surface of the first sub-support portion which is close to the at least three rotary shafts in such a manner that the respective surfaces of the rotary shaft connecting member and the rotary shaft slider face the step-shaped surface of the first sub-support portion.

10. The support apparatus according to claim 1, wherein the rotary shaft assembly further comprises a linkage hinge, the linkage hinge comprises a plurality of linkage portions, a plurality of adjacent rotary shafts is connected through the plurality of linkage portions, and the plurality of adjacent rotary shafts is bent or unfolded through the plurality of linkage portions.

11. The support apparatus according to claim 10, wherein the plurality of linkage portions is arranged in at least two rows, adjacent linkage portions in a same row are meshed through transmission teeth, and adjacent linkage portions in different rows are connected through respective rotary shafts.

12. A foldable display module, comprising:
a flexible screen; and
the support apparatus according to claim 1, configured to support the flexible screen.

13. A display device, comprising:
a shell; and
a display module partially received in the shell and comprising:
a flexible screen; and
a support apparatus configured to support the flexible screen and comprising:
a support portion comprising a first support portion and a second support portion connected with the first support portion;
a driving assembly comprising a rotary shaft assembly and a linkage assembly connected with the rotary shaft assembly;
a gear assembly;
a first rack; and
a second rack, wherein the gear assembly is configured to mesh with both the first rack and the second rack, the rotary shaft assembly comprises a plurality of rotary shafts arranged in parallel, the second support portion is slidably provided on the rotary shaft assembly, and the second support portion is configured to be bent or unfolded together with the rotary shaft assembly; and the rotary shaft assembly is configured to:
when the rotary shaft assembly is bent, the first support portion is driven by the linkage assembly to move away from or close to the rotary shaft assembly, and the shell is driven by the linkage assembly to move in a direction which is opposite to a moving direction of the first support portion.

14. The display device according to claim 13, wherein the linkage assembly comprises:
a plurality of connecting rods;
a transmission assembly rotatably connected with the rotary shaft assembly; and
a rotary shaft slider provided on the transmission assembly and slidably connected with the transmission assembly, wherein the rotary shaft slider is rotatably connected with the rotary shaft assembly through the plurality of connecting rods, the first support portion is slidably connected with the transmission assembly, and the first support portion is provided at a side of the transmission assembly facing away from the rotary shaft slider.

15. The display device according to claim 14, wherein the transmission assembly comprises:
a rotary shaft connecting member rotatably connected with the rotary shaft assembly; and
a transmission member provided on the rotary shaft connecting member, wherein the rotary shaft connecting member is slidably connected with the rotary shaft slider through the transmission member, and the rotary shaft connecting member is slidably connected with the first support portion through the transmission member.

16. The display device according to claim 15, wherein the transmission member comprises a swinging rod provided with a first connecting hole, a second connecting hole, and a third connecting hole arranged at intervals in an extending direction of the swinging rod; the swinging rod comprises a first end and a second end opposite to each other in the extending direction of the swinging rod, and the first end of the swinging rod is rotatably connected with the rotary shaft slider through the first connecting hole, and the second end of the swinging rod is rotatably connected with the first support portion through the third connecting hole; and the swinging rod is rotatably connected with the rotary shaft connecting member through the second connecting hole, and the swinging rod is configured to swing relative to the rotary shaft connecting member when the rotary shaft assembly is bent or flattened.

17. The display device according to claim 16, wherein a distance between the first connecting hole and the second connecting hole is less than a distance between the second connecting hole and the third connecting hole.

18. The display device according to claim 17, wherein the swinging rod further comprises a fourth connecting hole provided at the first end thereof, a distance between the fourth connecting hole and the second connecting hole is greater than the distance between the first connecting hole and the second connecting hole, and the shell is connected with the swinging rod through the fourth connecting hole.

19. The display device according to claim 15, wherein the first rack is provided on the rotary shaft slider, the second rack is provided on the first support portion, a third rack is provided on the shell, and the gear assembly is configured to mesh with the third rack.

20. The display device according to claim 15, wherein the plurality of rotary shafts comprises at least three rotary shafts, and the transmission assembly is provided at both sides of the at least three rotary shafts in an arrangement direction of the at least three rotary shafts; the first support portion comprises a step-shaped first sub-support portion, and first sub-support portion has a step-shaped surface which is parallel to the arrangement direction of the at least three rotary shafts; and the rotary shaft connecting member and the rotary shaft slider comprise respective surfaces which are parallel to the arrangement direction of the at least three rotary shafts, and the rotary shaft connecting member and the rotary shaft slider are provided on the step-shaped surface of the first sub-support portion which is close to the at least three rotary shafts in such a manner that the respective surfaces of the rotary shaft connecting member and the rotary shaft slider face the step-shaped surface of the first sub-support portion.

* * * * *